US010145682B2

(12) United States Patent
Sagemueller et al.

(10) Patent No.: US 10,145,682 B2
(45) Date of Patent: Dec. 4, 2018

(54) REDUCTION OF ERRORS OF A ROTATING DEVICE USED DURING THE DETERMINATION OF COORDINATES OF A WORKPIECE OR DURING THE MACHINING OF A WORKPIECE

(71) Applicant: Carl Zeiss Industrielle Messtechnik GmbH, Oberkochen (DE)

(72) Inventors: Rainer Sagemueller, Fachsenfeld (DE); Dominik Seitz, Schwaebisch Gmuend (DE); Tobias Held, Noerdlingen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 393 days.

(21) Appl. No.: 15/072,644

(22) Filed: Mar. 17, 2016

(65) Prior Publication Data
US 2016/0195389 A1 Jul. 7, 2016

Related U.S. Application Data

(63) Continuation of application No. PCT/EP2014/070383, filed on Sep. 24, 2014.

(30) Foreign Application Priority Data

Sep. 26, 2013 (DE) .................. 10 2013 219 389

(51) Int. Cl.
*G01B 21/04* (2006.01)
*G01B 5/008* (2006.01)
*G05B 19/401* (2006.01)

(52) U.S. Cl.
CPC ........... *G01B 21/045* (2013.01); *G01B 5/008* (2013.01); *G05B 19/401* (2013.01)

(58) Field of Classification Search
CPC ....... G01B 21/045; G01B 5/008; G01B 5/012
(Continued)

(56) References Cited

U.S. PATENT DOCUMENTS 5,204,824 A * 4/1993 Fujimaki .............. G05B 19/401
33/503
9,383,198 B2 * 7/2016 Sagemueller ........ G01B 21/045
(Continued)

FOREIGN PATENT DOCUMENTS

| DE | 10 2012 205 599 A1 | 10/2013 |
| WO | WO 2010/054767 A1 | 5/2010 |
| WO | WO 2013/007285 A1 | 1/2013 |

OTHER PUBLICATIONS

Eric R. Marsh et al.; "A comparison of reversal and multiprobe error separation;" Mar. 25, 2009; pp. 85-91.
(Continued)

*Primary Examiner* — Christopher W Fulton
(74) *Attorney, Agent, or Firm* — Harness, Dickey & Pierce, P.L.C.

(57) ABSTRACT

A method for reducing errors in a rotating device permitting rotation of a workpiece about a rotational axis during the determination of co-ordinates or during the machining of the workpiece. The workpiece is rotated about the rotational axis and first and second measuring signals of a first and a second course of the workpiece surface are generated by the coordinate measuring device while the device is positioned at different first and second circumferential positions of the rotational axis. The first and the second measuring signals are used for separating redundant surface information and error information contained in the signals. The redundant surface information relates to the workpiece surface revolving around the rotational axis and the error information relates to errors in the rotating device resulting from devia-
(Continued)

tions between actual positions and orientations of the rotational axis and corresponding ideal positions and orientations.

15 Claims, 4 Drawing Sheets

(58) Field of Classification Search
USPC .................................. 33/502, 503; 73/1.79
See application file for complete search history.

(56) References Cited

U.S. PATENT DOCUMENTS

| | | | | |
|---|---|---|---|---|
| 9,772,181 | B2* | 9/2017 | Seitz | G01B 11/26 |
| 9,909,865 | B2* | 3/2018 | Sagemueller | G01B 21/04 |
| 2014/0130362 | A1* | 5/2014 | Ishikawa | G01B 21/045 |
| | | | | 33/503 |
| 2014/0167745 | A1 | 6/2014 | Held et al. | |
| 2014/0236520 | A1* | 8/2014 | Engel | G01D 5/24452 |
| | | | | 702/95 |
| 2015/0052767 | A1 | 2/2015 | Sagemueller et al. | |
| 2015/0345937 | A1* | 12/2015 | Seitz | G01B 21/042 |
| | | | | 250/231.13 |
| 2016/0195869 | A1* | 7/2016 | Sagemueller | G05B 19/402 |
| | | | | 700/195 |
| 2018/0031369 | A1* | 2/2018 | Seitz | G01B 11/26 |

OTHER PUBLICATIONS

A. Vissiere et al.; "A newly conceived cylinder measuring machine and methods that eliminate the spindle errors;" Mar. 19, 2012; 12 pp.
Cha'o-Kuang Chen at al.; "A method for measuring and separating cylindrical and spindle errors in machine tool rotational parts;" Oct. 15, 1998; 10 pp.
B. Knapp et al.; "Nanometer-level axis of rotation metrology for a high-precision macromolecular X-ray diffractometer;" Mar. 22, 2013; 4 pp.
Xue Zi YEXiaoyou; "Cylindricity Compound Errors Reversal Separation Method;" Nov. 13, 2006; 7 pp.
International Search Report for PCT/EP2014/070383; dated Dec. 2, 2014; 2 pp.
German language International Preliminary Report on Patentability for PCT/EP2014/070383; dated Sep. 9, 2015; 17 pp.

* cited by examiner

REDUCTION OF ERRORS OF A ROTATING DEVICE USED DURING THE DETERMINATION OF COORDINATES OF A WORKPIECE OR DURING THE MACHINING OF A WORKPIECE

CROSS-REFERENCES TO RELATED APPLICATIONS

This application is a continuation of international patent application PCT/EP2014/070383, filed on Sep. 24, 2014 designating the U.S., which international patent application has been published in German and claims priority from German patent application DE 10 2013 219 389.0, filed on Sep. 26, 2013. The entire contents of these priority applications are incorporated herein by reference.

FIELD OF INVENTION

The invention relates to a method for reducing errors of a rotary device, wherein the errors occur or become effective when determining coordinates of a workpiece or when machining a workpiece. The rotary device enables a rotational movement of the workpiece about an axis of rotation of the rotary device while determining the coordinates or while machining the workpiece. The invention furthermore relates to an arrangement by means of which the method is implementable. Here, the assumption is made that the errors of the rotary device are reproducible, at least in part.

BACKGROUND OF THE INVENTION

It is common practice to rotatably support workpieces for the purposes of measuring the coordinates thereof or for the purposes of machining the workpiece. By way of example, workpieces are arranged on rotatable tables (so-called rotary tables) in the field of coordinate metrology. In this way, the workpiece can be brought into various work alignments, in which the coordinate measuring machine (abbreviated CMM) operates, i.e. measures coordinates of the workpiece. In particular, the coordinates of the workpiece can be measured continuously (e.g. in scanning fashion) while the rotary device rotates the workpiece about the axis of rotation thereof. Using the rotary device, the required measurement time/machining time can be shortened, the accuracy of the measurement/machining can be increased and/or a simpler coordinate measuring apparatus or a simpler machining tool can be used.

Corresponding statements apply to the machining of a workpiece by a machine tool. The workpiece can be brought into various work alignments in order to machine the workpiece. In particular, the workpiece can be rotated continuously while it is being machined.

In particular, the work alignment can be defined by a direction that extends perpendicular to the axis of rotation and through a point on the surface of the workpiece, at which the workpiece is sensed or at which the workpiece is machined. Therefore, the force acting on the workpiece during the tactile probing of the workpiece with a probe or during the machining of the workpiece can act, in particular, perpendicular to the axis of rotation in the direction of the work alignment.

In the field of coordinate metrology, for checking the shape of a workpiece, it is often advantageous to sense the workpiece with a probe which has an almost constant work alignment and work position relative to the rotary device while the rotary device rotates the workpiece. The work position and work alignment are not entirely constant, since the workpiece is generally not arranged exactly rotationally symmetrically with respect to the axis of rotation of the rotary device and/or is not, or not exactly, shaped rotationally symmetrically. By way of example, a probe of a coordinate measuring machine, which probes the surface of the workpiece in a tactile fashion, may be held by the coordinate measuring machine in a fixed position and with a fixed alignment, the probe being deflected to a different extent relative to a holder of the probe, depending on the workpiece shape to be measured. Owing to the almost constant work alignment and work position, errors of the coordinate measurement due to position-dependent and alignment-dependent errors of the coordinate measuring machine can be minimized. The errors of the rotary device in this case crucially determine the measurement result. The speed of the measurement of the workpiece can thereby also be increased in many cases.

Errors of the rotary device are caused by deviations of a real rotational movement from an ideal rotational movement. Eric Marsh describes in "Precision Spindle Metrology", ISBN 978-1-932078-77-0, in particular Chapter 2, concepts for the description of movement errors of a precision spindle. The error separation method described by Marsh assumes a measurement design, in which three sensors simultaneously detect the movements of a rotating calibration body. The three sensors are held by a common holder. The measurement signals from the three sensors, recorded simultaneously, thereafter permit, by calculation, a separation of the shape errors of the calibration body (a test sphere) and the movement errors of the spindle.

The magnitude of the error of the rotary device in many cases depends on the introduced forces and moments, which are exerted by the mass of the workpiece arranged at the rotary device and/or by forces of a coordinate measuring apparatus or of a machining tool on the workpiece. Dynamic effects may also occur in the case of the rotational movement of the rotary device. At the location of the measurement of a workpiece, these errors are superposed on the errors of the workpiece to be measured, and so the errors of the workpiece cannot be measured exactly. When machining a workpiece, the errors of the rotary device lead to errors of the workpiece compared to a standard. Particularly large measurement errors or machining errors can be created in the case of, in particular, large workpieces due to the geometric amplification of the errors of the rotary device with increasing distance from the rotary device.

In order to reduce the errors of the rotary device, the rotary device may be designed in such a way that the error meets specifications. In particular, it is possible to use oil or air bearings for mounting the rotationally mobile parts of the rotary device, and in the case of motor-driven rotary devices, it is possible to use direct drives. The smaller the error of the rotary device is intended to be, the higher is the design outlay. The outlay for the production of such rotary devices is high and such rotary devices have large dimensions and they are mechanically complex and sensitive to external influences, such as dirtying, in many cases. In the case of arrangements for measuring coordinates or machining workpieces, which have roller bearings without need for a supply of air or oil, an oil or air bearing of the rotary device constitutes a significant additional outlay. In particular, the invention relates to coordinate measuring machines with such a roller bearing.

The reduction of errors of the rotary device by way of construction also leads to a restriction in the possibilities of use of the rotary device since the high mechanical accuracy of the rotational movement does not admit all desired fields of use. By way of example, rotary devices with an air bearing can only be loaded with restricted tilting moments and can therefore only rotate workpieces whose mass is not too great.

As an alternative or in addition, errors of the rotary device may be measured with a coordinate measuring machine, a calibration body or an arrangement of calibration bodies being arranged on the rotatable part of the rotary device (for example placed on the rotary table) and measured. However, measuring the errors of the rotary device in respect of all six possible degrees of freedom of movement is time-consuming. If a high accuracy is required, the calibration needs to be repeated, for example when the rotary device is subjected to temperature variations. Corresponding considerations apply for a rotary device which is configured in order to hold workpieces rotatably in the machining range of a machine tool. The outlay for calibration is then usually even greater compared with coordinate metrology, since in the field of coordinate metrology the coordinate measuring machine which subsequently carries out the measurement of workpieces can mostly also be used for the calibration.

It is an object of the present invention to specify a method for reducing errors of a rotary device when determining coordinates of a workpiece or when machining a workpiece, which method requires little measurement and structural outlay in order to keep the error of the rotary device low. In particular, the ways of implementing a method for measuring a workpiece or for machining a workpiece already described above should be possible with little outlay. Furthermore, it is an object of the present invention to specify an arrangement for carrying out the method.

SUMMARY OF THE INVENTION

The invention is based on the finding that rotary devices for coordinate measuring machines and machine tools in many cases have various error sources, which lead to various error contributions to the overall error of the rotary device. In particular, these various error contributions are translational errors, i.e. the axis of rotation moves in a straight-line direction during the rotational movement, and rotational errors, i.e. the axis of rotation is differently inclined relative to the ideal invariant axis of rotation and/or extends differently askew relative to the ideal axis of rotation, depending on the rotational position of the parts of the rotary device that can be moved in rotation relative to one another. The various error contributions compensate one another or amplify one another, depending on the work position and work alignment of the coordinate measuring apparatus or of the machining tool of the machine tool relative to the rotary device.

Moreover, the invention is based on the finding that individual error sources at specific work positions and work alignments do not have an effect, or have a smaller effect, on the error of the measurement or the machining of the workpiece than other work alignments and work positions. By way of example, the actual axis of rotation of the rotary device can tilt about a coordinate axis that extends perpendicular to the ideal axis of rotation. In the process, the tilt angle (the angle between the real and the ideal axis of rotation) can change during a rotational movement of the rotary device. When measuring or machining a workpiece along a work alignment extending in the direction of the aforementioned coordinate axis, the position of a workpiece rotated by the rotary device does not change on account of this error source. By contrast, however, on account of this error source (i.e. on account of the tilt movement), the position of the workpiece changes in directions which extend perpendicular to the ideal axis of rotation and perpendicular to the aforementioned coordinate axis and which do not cut the coordinate axis. The error of this error source has a stronger or weaker effect, depending on the axial distance from the center of the tilt movement (the axial distance is determined in the direction of the ideal axis of rotation).

It is proposed to arrange a workpiece at the rotary device such that part of the rotary device rotates the workpiece when the rotary device is operated. Furthermore, a coordinate measuring apparatus, which measures coordinates of a surface of the workpiece, is used. The coordinate measuring apparatus is successively positioned at various positions with respect to the axis of rotation and the workpiece is rotated by the rotary device in each case while the coordinate measuring apparatus is at one of these positions of the axis of rotation. During the rotation, the coordinate measuring apparatus in each case measures an extent of the surface of the workpiece, in particular in a scanning fashion, i.e. there is permanent contact between the coordinate measuring apparatus and the surface of the workpiece in the case of a coordinate measuring apparatus probing in a tactile manner. Alternatively, in the case of an optical sensor, the extent of the surface is detected in each case in a measurement region of the measuring apparatus while the surface of the workpiece moves through the measurement region. Further measurement methods are also possible; by way of example, the coordinate measuring apparatus can have a distance sensor which measures the distance between itself and the surface of the workpiece. By way of example, distance sensors measure in an electric fashion (e.g. in accordance with the principle of a capacitive or inductive measurement) or tactile fashion (e.g. driven pneumatically or by an electric drive) or optical fashion (e.g. by a time-of-flight measurement or by triangulation).

In any case, the extent of the surface of the workpiece is measured while the workpiece is rotated by the rotary device. Measurement values of this extent of the surface, which are measured by the coordinate measuring apparatus, can be recorded either continuously over the extent of the surface or spaced apart in the direction of the extent of the surface, for example in accordance with a sampling rate with which the coordinate measuring apparatus works during the rotational movement of the workpiece. However, in any case, there is information about the extent of the surface when the measurement of the extent is complete.

Here, and at different points in the description, a measurement of the workpiece or a measurement of the extent of the surface during the rotation of the workpiece (or, vice versa, of the rotation during the measurement) should in this case also be understood to include the case where the rotational movement is repeatedly interrupted and the coordinate measuring apparatus measures a point or region of the extent of the surface of the workpiece when at rest. However, naturally, depending on the type of measurement of the surface by the coordinate measuring machine, a measurement can also be carried out during the rotation even without being at rest.

As mentioned above, the coordinate measuring apparatus is situated at a specific position with respect to the axis of rotation while it measures the extent of the surface. Here, this is a position with respect to the circumferential direction around the axis of rotation. Therefore, the various positions, at which the coordinate measuring apparatus is positioned successively in each case to measure an extent of the surface of the workpiece, differ in terms of the circumferential direction. By way of example, the respective circumferential position can therefore be specified by an angle of rotation, which specifies the angular distance from a fixed angular position in respect of the axis of rotation. However, this fixed angular position does not co-rotate when the rotary device, and hence the workpiece, is rotated about the axis of rotation while the coordinate measuring apparatus at the likewise fixed circumferential position measures the extent of the surface.

Depending on the measurement principle of the coordinate measuring apparatus, its position in the radial direction with respect to the axis of rotation may vary, depending on the extent of the surface of the workpiece which it detects during the rotation of the workpiece about the axis of rotation. This is the case, in particular, if the extent of the surface does not have a circular line shape and if it is not rotationally symmetric with respect to the axis of rotation and if the coordinate measuring apparatus probes the surface in a tactile manner in order to measure the surface. By contrast, an optical sensor or a distance sensor can measure the extent of the surface from, for example, a fixed radial position with respect to the axis of rotation.

Measuring the extent of the surface is understood to mean measuring at least one measurement variable (for example the distance to the surface or at least one coordinate of the measured point at the surface), wherein the measurement signals at least also contain information from which the coordinates of the surface of the workpiece along the extent can be determined. However, since the rotary device in general does not carry out an ideal circular rotational movement with an axis of rotation stationary in space but instead has the aforementioned translational and rotational movement errors, the measurement signals which the coordinate measuring apparatus generates during the measurement of the extent of the surface contain erroneous information about the extent of the surface.

It is a discovery of the present invention that, although the measurement signals from the measurement of an extent of the surface are erroneous due to the movement errors of the rotary device, these signals also contain the information about the movement error. Therefore, if the extent of the surface is measured in each case at various circumferential positions, the overall information from the various measured extents contains the information both about the actual extent of the surface without movement error and the information about the movement error. As a result of the measurement of the extent of the surface at various circumferential positions, these various items of information can be separated from one another and therefore be determined. In this case, it is preferable for the workpiece to remain in the same position and alignment with respect to the part of the rotary device, at which it is arranged and by means of which it is rotated about the axis of rotation, when the coordinate measuring apparatus is brought into a different circumferential position. The part of the rotary device and the workpiece therefore also remain in the same position and alignment with respect to one another when the coordinate measuring apparatus in each case measures the extent of the surface of the workpiece at the various circumferential positions. This is advantageous in that positions of the extent of the surface of the workpiece are always associated with the same positions of the part of the rotary device in the circumferential direction and in that the workpiece loads the rotary device in the same manner. By way of example, no errors are created either by virtue of the imaginary axis of rotation piercing the workpiece at a different position and/or with a different alignment than previously. As a result of only the circumferential position of the coordinate measuring apparatus being changed, the separation of the information about the movement error from the information about the extent of the surface is made possible in a simple manner.

In particular, the various circumferential positions can be selected or predetermined in such a way that they lie in different segments of the circumference, that is to say in different segments of the overall rotational angular range of 360° about the axis of rotation. The segments, in which only one of the various circumferential positions lies in each case, do not overlap and, for example, can each be at least 90° and, worded in general terms, correspond to the fraction of the overall rotational angular range which emerges by dividing the overall rotational angular range by the number of different circumferential positions. By way of example, if the measurement is carried out at three circumferential positions, each one of the three segments extends over an angular range of 120°. In the case of four circumferential positions, each one of the four segments extends over an angular range of 90°. What is ensured by the circumferential positions lying in different segments is that different items of information about the movement error of the rotary device are obtained. By way of example, this would not be the case, or not be the case to a sufficient extent, if all three circumferential positions lie close together.

Within the segments, the circumferential position is preferably selected in such a way that the various circumferential positions have a minimum angular distance from one another, which e.g. is a third or half of the angular range, over which the segments extend. What this renders possible, in particular, is that the circumferential positions do not have the same angular distance from one another but nevertheless lie in the various segments. An arrangement of the various circumferential positions with unequal angular distances between the adjacent circumferential positions is advantageous in that periodically effective movement errors can be detected in the rotational movement.

Preferably, all angular distances of the adjacent circumferential positions, with the exception of one of the angular distances of two adjacent circumferential positions, deviate from the constant angular distance which would emerge in the case of an equal distribution of the circumferential positions about the axis of rotation (by way of example, in the case of three circumferential positions this is a constant angular distance of 120°). By way of example, the deviation is at least one eighth, preferably at least one sixth, of the angular range of the segments. Therefore, if the segments are e.g. likewise 120°, the minimum angular distance should be a third of 120°, i.e. 40°, and two selected angular distances should differ from the constant angular distance by at least one eighth, i.e. 15°, and the three circumferential positions could be for example at the angle positions 60° (in the first segment between 0° and 120°), 143° (in the second segment between 120° and) 240° and 267° (in the third segment between 240° and 360°).

If preliminary information is present about the movement errors of the rotary device, the circumferential positions can be selected alternatively, or in accordance with the preceding description, in such a way that the movement errors are particularly large at all circumferential positions or at a plurality of the circumferential positions and therefore clearly have an effect as errors on the measured extent of the surface. This ensures that the movement errors can be established from the measurement signals.

The movement error, which can be determined by separation from the redundant surface information about the extent of the surface of the workpiece, is a reproducible movement error of the rotary device. In the case of high-quality rotary devices, as are used in coordinate metrology, the assumption can be made that the non-reproducible component of the movement error is very small when the arrangement of the workpiece at the rotary device and, moreover, the alignment of the rotary device in the gravitational field of the earth remain unchanged. With one constraint, this also applies if the coordinate measuring apparatus is brought into a different circumferential position in respect of the axis of rotation and then measures an extent of the surface of the workpiece again, while the rotary shaft rotates the workpiece. The constraint consists of the fact that a coordinate measuring machine probing in a tactile manner applies a measuring force onto the surface. However, the measuring force is generally small and rotary devices for coordinate metrology are generally constructed in such a way that the measuring force does not cause any substantial movement error.

The fact that it is not only one workpiece that can be measured by the coordinate measuring apparatus, but rather a plurality of workpieces which can be arranged successively at the rotary device, in particular a plurality of workpieces of a similar kind or of the same type, is discussed below. Accordingly, the first workpiece, the extent of the surface of which is measured in the manner according to the invention by the coordinate measuring apparatus from different circumferential positions, can subsequently be machined by a tool while the workpiece is arranged at the rotary device and rotated by the latter. Moreover, it is possible that it is not the first workpiece, which, for example, is a sample part or a calibration body, but a similar workpiece or workpiece of the same type that is subsequently arranged at the rotary device and machined by a tool. Therefore, the workpiece is preferably measured under conditions which also prevail during a subsequent measurement or machining of the workpiece, a similar workpiece or a workpiece of the same type.

By way of example, when using a coordinate measuring apparatus probing in a tactile manner, the extent of the surface of the workpiece can be measured in a region in which a similar workpiece or workpiece of the same type is subsequently also intended to be measured and, in particular, is also measured by the same coordinate measuring apparatus. By way of example, the similar workpiece or workpiece of the same type is positioned at the same location of the rotary device and an extent of the surface of the similar workpiece or workpiece of the same type is measured by the coordinate measuring apparatus, which extent lies at the same location (in particular at the same axial position with respect to the axis of rotation of the rotary device) as was the case when measuring the first workpiece for the purposes of separating the information about the extent of the surface on the one hand and the information about the movement error on the other hand. In this manner, workpieces from mass production can be measured with a high accuracy and, overall, with little outlay for determining the movement error.

As a result of an optional repetition of carrying out the method according to the invention (optionally after a fixed predetermined number of workpieces), the result of a preceding instance of carrying out the method according to the invention can be checked and/or it is possible to take into account that the ambient conditions, such as e.g. the temperature, have changed. Therefore, if, for example, a change in the temperature which satisfies a predetermined criterion was measured (e.g. a minimum temperature difference is being exceeded), the workpiece from mass production to be measured then can be re-measured at various circumferential positions by means of the coordinate measuring apparatus.

Therefore, coordinates of a surface of a second workpiece (in particular of a workpiece of the same type) are measured by the coordinate measuring apparatus, in particular taking into account the error information about the movement errors of the rotary device separated from the redundant surface information about the extent of the surface of the first, already measured workpiece. In particular, the coordinate measuring apparatus in this case is situated at the same axial position with respect to the axial direction of the axis of rotation and/or at one of the circumferential positions at which the coordinate measuring apparatus was positioned during the rotation of the first workpiece about the axis of rotation, in order to measure the extent of the surface of the first workpiece.

Alternatively or additionally, the first workpiece is measured by the coordinate measuring apparatus positioned at the various circumferential positions in the case of an alignment of the rotary device in the gravitational field of the Earth, while the rotary device rotates the respective workpiece about the axis of rotation. What this ensures is that the weight of the first workpiece exerts the same forces and moments on the rotary device which likewise act on the rotary device in the case of the same alignment of the rotary device and the same arrangement of a second workpiece, which is similar to the first workpiece or of the same type. Therefore, the same reproducible movement errors occur when measuring the first workpiece and the second workpiece and these therefore can be measured by the measurement of the first workpiece, according to the invention, with the coordinate measuring apparatus positioned at the various circumferential positions and be separated from the geometric information about the workpiece.

If the coordinate measuring apparatus cannot be positioned at the same circumferential position and/or axial position at which the coordinate measuring apparatus was positioned when measuring the first workpiece, it is preferable, when measuring the second workpiece, to arrange the coordinate measuring apparatus as closely as possible to the positions when measuring the first workpiece. Even in the case of only approximately the same positioning, effects of a geometric amplification of the movement errors by positioning the coordinate measuring apparatus at far-apart axial positions can be reduced or avoided. Alternatively, the movement errors for a positioning of the coordinate measuring apparatus at a different position, in particular at a different axial position with respect to the axis of rotation, can be established by computation as expected errors from the separated movement errors. This will be discussed in more detail.

If a first (or only) workpiece is measured in the manner according to the invention during the rotation by the rotary device, a preceding correction of the movement errors of the rotary device is not necessary since the information about the movement error in the measurement results of the measurement of the extent of the surface of the workpiece is measured by means of the at various circumferential positions of the coordinate measuring apparatus. By contrast, the other workpieces are preferably not measured at different circumferential positions of the coordinate measuring apparatus, but e.g. only at one circumferential position. This circumferential position can be a particularly well-suited circumferential position, which can be determined by evaluating the measurement signals from measuring the first workpiece. Moreover, the other workpieces are (or, more generally: at least one other, second workpiece is) preferably measured and/or machined using the error information which was separated from the redundant surface information from the various measured extents of the surface of the first workpiece. In particular, there is a correction of the rotational movement of the rotary device, which rotates the second workpiece during measurement and/or machining, using the separated error information, i.e. the movement errors. In particular, the correction can be carried out by virtue of corresponding correction data being stored in a machine-readable manner and, for example, being taken into account by a controller of a coordinate measuring machine, which uses the coordinate measuring apparatus for measuring the second workpiece, or being taken into account by a machine tool, which machines the second workpiece using a tool. By way of example, the controller of the CMM calculates a correction in the form of a displacement of the measured surface point of the second workpiece, which undoes a deviation of the real rotational movement of the rotary device from the ideal, desired rotational movement of the rotary device, from the machine-readable data during the measurement of surface coordinates of the second workpiece.

Preferably, the rotary device in each case carries out at least one complete revolution of the workpiece about the axis of rotation while the coordinate measuring apparatus is positioned at a fixed circumferential position with respect to the axis of rotation and while it measures the extent of the surface of the workpiece. What this ensures is that the various extents, which the coordinate measuring apparatus measures at the various circumferential positions, in each case have the greatest amount of information possible about the movement error and, optionally, also the same information about the extent of the surface if the coordinate measuring apparatus is situated at the same axial position at the various circumferential positions. Naturally, the axial position of the coordinate measuring apparatus at the various circumferential positions can, in general, only be the same with respect to the ideal axis of rotation, since movement errors of the rotary device also lead to deviations (e.g. a wobble movement) of the real axis of rotation from the ideal axis of rotation. The corresponding statement therefore also applies to the circumferential positions. Although these are preferably fixedly predetermined, they can only be set precisely with respect to the ideal axis of rotation. However, rotary devices, which are used for measuring coordinates or producing workpieces, are generally so precise that, despite the movement errors, no substantial differences which are meaningful for carrying out the method according to the invention emerge in the error information and the redundant surface information which originate from the various extents of the surface.

The invention is furthermore advantageous in that a coordinate measuring apparatus of a coordinate measuring machine and hence of that CMM, which is also used for measuring other regions of the surface of the workpiece and/or which thereafter measures at least one further workpiece which is arranged at the rotary device, can be used. Therefore, no additional holder for measurement sensors, for which Marsh proposes in the aforementioned publication, is required. Since the CMM is usually capable of moving the coordinate measuring apparatus relative to the workpiece, it is also possible to measure workpieces of different type in the manner according to the invention and/or the same workpiece can be measured at different axial positions in the manner according to the invention.

However, the invention is not restricted to carrying out at most one complete revolution of the workpiece during the measurement of the extent of the surface of the workpiece. Rather, the rotary device can rotate the workpiece through more than one complete revolution, for example through one and a half revolutions or at least through a plurality of complete revolutions such that redundant information is also obtained within the measured extent of the surface while the coordinate measuring apparatus is positioned at the same circumferential position and the measurement uncertainty, for example, is reduced in this manner. The information is redundant since successively measured portions of the extent of the surface lie in the same region of the surface as the same region is reached again after one complete revolution. It is preferable for the rotary device to rotate the workpiece about a whole number of complete revolutions in the case of an unchanging circumferential position of the coordinate measuring apparatus.

The method according to the invention and the corresponding arrangement are particularly well suited in particular if a determination of the movement errors of the rotary device with a generally valid result of the determination is not possible or too complicated. By way of example, the rotary device can be used under different conditions by the user, for example with a different alignment of the axis of rotation in the gravitational field of the Earth and/or with different workpieces arranged at the rotary device, which workpieces exert different forces and torques on the rotary device. By way of example, if the axis of rotation extends in the horizontal direction, completely different forces and moments, which, in particular, are caused by the weight of the rotary device itself and of the workpiece, occur than in the case of an axis of rotation extending vertically. In order to describe the various alignments of the rotary device and, optionally, also the various forces and moments exerted by the workpiece in a generally valid manner, much outlay is required. By way of example, use would have to be made of a corresponding mathematical model, which takes into account all occurring alignments and forces and moments. Furthermore, time-consuming measurements in the style of calibrations of the rotary device are required for this purpose. By contrast, the outlay for carrying out the method according to the invention in the case of respectively modified conditions (e.g. in the case of a specific alignment of the axis of rotation) is comparatively small.

Furthermore, the method according to the invention also renders it possible to improve the movement error of inaccurate rotary devices. At least, it is possible to establish and, for example, correct the reproducible components of the movement error. The non-reproducible error components are averaged out, particularly when carrying out complete revolutions of the workpiece during the measurement of the extent of the surface.

Moreover, it is possible in accordance with a preferred embodiment of the invention to use the error information (i.e. the established movement errors) separated from the redundant surface information to check available error information about errors of the rotary device and optionally to correct the latter. Such available error information is, for example, also supplied by the producer of the rotary device and it is, for example, machine-readable in the manner as already mentioned above and therefore usable by coordinate measuring machines and machine tools. By means of the error information established in the manner according to the invention, it is possible to check the available error information, at least selectively for the respective operating situation (e.g. the axial position of the coordinate measuring machine, the valid ambient temperature and/or the currently acting forces and moments). By way of example, the use of the machine-readable data is deactivated such that there is no automatic correction by the CMM or the machine tool using the machine-readable data. In this manner, the complete movement error is completely effective for the measurement of the extent of the surface by the coordinate measuring apparatus.

By way of example, a corresponding coordinate measuring machine can therefore have a special mode of operation, in which possibly available machine-readable data for correcting movement errors of the rotary device are not used while the method according to the invention is carried out. In particular, this allows the user to assess whether a new calibration of the rotary device overall is required and/or whether the rotary device is possibly worn and therefore needs to be serviced or replaced.

In general, it is therefore also possible that, depending on the check of available error information, which need not necessarily be available as machine-readable data for an automatic correction, a signal is emitted which indicates the need for a calibration of the rotary device and/or the need for servicing or a replacement. By way of example, the signal is output when a predetermined criterion is satisfied, said criterion relating both to the available error information and to the error information separated from the redundant surface information. By way of example, the signal can be output when the separated error information differs by more than a predetermined threshold from the available error information.

Alternatively, there can be an automatic correction on the basis of available error information about the movement error of the rotary device while carrying out the method according to the invention. In this case, the measurement signals which reproduce the extent of the surface of the workpiece and which were generated by the coordinate measuring apparatuses at the various circumferential positions only contain residual errors of the movement of the rotary device and/or errors of the automatic correction. The advantage consists of the fact that the residual errors and/or differences among the real measurement conditions are determined. The redundant surface information simultaneously contained in the measurement signals therefore enables a particularly exact determination of the coordinates of the workpiece surface, particularly in the region corresponding to the extent.

In particular, the invention can be used to measure regions of a workpiece surface which form an external circumference of the workpiece, as is the case for e.g. cylindrical circumferential surfaces, but also for non-rotationally symmetric circumferential surfaces of workpieces. A circumferential surface is characterized in that the surface normal extends across and, in particular, perpendicular to the axis of rotation of the rotary device, at which the workpiece is arranged. However, the invention also enables the measurement of an extent of a surface, the surface normal of which extends parallel or approximately parallel to the axis of rotation. By way of example, in the case of a cylindrical workpiece with a circular end face which is pierced centrally by the (imagined) axis of symmetry, the end face can be measured in terms of the extent thereof at a distance from the axis of rotation. By way of example, in this case the coordinate measuring apparatus only measures the planarity of the surface by measuring the coordinates in the direction of the coordinate axis, which extends parallel to the axis of rotation.

or is the invention restricted to the coordinate measuring apparatus being moved in respect to the axis of rotation for the positioning thereof at the various circumferential positions. Rather, the coordinate measuring apparatus can be at rest in the laboratory coordinate system (i.e. with respect to the surroundings of the measuring arrangement), while the rotary device with the workpiece arranged thereon overall is rotated about a second axis of rotation which extends coaxially with the axis of rotation of the rotary device. To this end, use can be made of, for example, a second rotary device, the axis of rotation of which extends coaxially with the axis of rotation of the rotary device to be checked or to be used for the measurement. Therefore, the coordinate measuring apparatus is brought into a second circumferential position from a first circumferential position by virtue of the rotary device being rotated by a second rotary device, the axis of rotation of which extends coaxially with the axis of rotation of the first rotary device, while the coordinate measuring apparatus remains at the location thereof. Naturally, combinations are also possible, i.e. there can be both a rotation of the rotary device together with the workpiece arranged thereon about a coaxial axis of rotation and a movement of the coordinate measuring apparatus, which can occur in the circumferential direction and/or in the radial direction with respect to the axis of rotation and/or in the axial direction of the axis of rotation (i.e. parallel to the axis of rotation or in the direction of the axis of rotation). An advantage consists of the fact that a coordinate measuring apparatus which has a single degree of freedom of the measurement, namely with respect to the radial direction, can be used in a simple manner. This is the direction from the coordinate measuring apparatus to the axis of rotation. Since this coordinate measuring apparatus is not moved, it need not be realigned in the direction of the axis of rotation either when it carries out a measurement at a different circumferential position. A realignment of the coordinate measuring apparatus would be an additional step connected with outlay.

However, an advantage of a coordinate measuring machine also follows herefrom, when the coordinate measuring apparatus is moved in order to be brought into a modified circumferential position. A typical coordinate measuring machine, which can move the measuring apparatus in at least two mutually independent directions, is capable to this end. It is also conventional in the case of coordinate measuring machines that the measuring apparatus does not only have a single degree of freedom of the measurement. Therefore, such a measuring apparatus need not be realigned in the direction of the axis of rotation when it is moved into the modified circumferential position.

In particular, the following is proposed: A method for reducing errors of a rotary device when determining coordinates of a workpiece or when machining a workpiece, wherein the rotary device enables a rotational movement of the workpiece about an axis of rotation of the rotary device when determining the coordinates or when machining the workpiece, and wherein the method comprises the following steps:

a) a first workpiece is arranged at the rotary device,
   b) a coordinate measuring apparatus for measuring coordinates of a surface of the first workpiece is positioned at a first circumferential position with respect to the circumferential direction of the axis of rotation,
   c) the workpiece is rotated about the axis of rotation by the rotary device while the coordinate measuring apparatus positioned at the first circumferential position measures a first extent of the surface of the first workpiece which extends around the axis of rotation due to the rotation of the first workpiece such that corresponding first measurement signals of the first extent are generated, d) the coordinate measuring apparatus is positioned at a second circumferential position with respect to the circumferential direction of the axis of rotation which differs from the first circumferential position, e) the workpiece is rotated about the axis of rotation by the rotary device while the coordinate measuring apparatus positioned at the second circumferential position measures a second extent of the surface of the first workpiece which extends around the axis of rotation due to the rotation of the first workpiece such that corresponding second measurement signals of the second extent are generated, f) steps d) and e) are optionally repeated at least one further time, i.e. the coordinate measuring apparatus is respectively positioned at a further circumferential position with respect to the circumferential direction of the axis of rotation which differs from the first circumferential position and the second circumferential position and from other circumferential positions, at which the coordinate measuring apparatus was already positioned and at which the coordinate measuring apparatus has already measured an associated extent of the surface of the first workpiece, and the workpiece is rotated about the axis of rotation by the rotary device while the coordinate measuring apparatus positioned at the further circumferential position measures a further extent of the surface of the first workpiece which extends around the axis of rotation due to the rotation of the first workpiece such that corresponding further measurement signals of the further extent are generated, g) the redundant surface information and the error information are separated from one another from the first, from the second and from the optional further measurement signals, which have redundant surface information about the surface of the first workpiece extending around the axis of rotation and error information about errors of the rotary device due to deviations between, firstly, actual positions and actual alignments of the axis of rotation and, secondly, corresponding ideal positions and ideal alignments of the axis of rotation.

Furthermore, the following is proposed: An arrangement for reducing errors of a rotary device when determining coordinates of a workpiece or when machining a workpiece, wherein the rotary device enables a rotational movement of the workpiece about an axis of rotation of the rotary device when determining the coordinates or when machining the workpiece, and wherein the arrangement comprises the following:

the rotary device, which has a first part and a second part with rotational mobility relative to the first part, wherein a first workpiece is arrangeable at the first part such that it is rotatable about the axis of rotation by way of the rotary device, a coordinate measuring apparatus for measuring coordinates of a surface of the first workpiece, a controller, configured to
measure a first extent of the surface of the first workpiece by controlling the coordinate measuring apparatus, which is positioned at a first circumferential position with respect to the circumferential direction of the axis of rotation, and generate corresponding first measurement signals, wherein the first extent of the surface extends about the axis of rotation due to a rotation of the first workpiece by way of the rotary device, measure a second extent of the surface of the first workpiece by controlling the coordinate measuring apparatus, which is positioned at a second circumferential position with respect to the circumferential direction of the axis of rotation, and generate corresponding second measurement signals, wherein the second circumferential position differs from the first circumferential position and the second extent of the surface extends about the axis of rotation due to a rotation of the first workpiece by way of the rotary device, optionally measure a further extent of the surface of the first workpiece by controlling the coordinate measuring apparatus, which is positioned at a further circumferential position with respect to the circumferential direction of the axis of rotation during at least one further optional measurement, and generate corresponding further measurement signals, wherein the further circumferential position differs from the first circumferential position and from the second circumferential position and from optional other further circumferential positions, and the further extent of the surface extends about the axis of rotation due to a rotation of the first workpiece by way of the rotary device, a separation apparatus, configured to separate the redundant surface information and the error information from one another from the first, from the second and from the optional further measurement signals, which have redundant surface information about the surface of the first workpiece extending around the axis of rotation and error information about errors of the rotary device, wherein the errors occur due to deviations between, firstly, actual positions and actual alignments of the axis of rotation and, secondly, corresponding ideal positions and ideal alignments of the axis of rotation.

In particular, the position and alignment of the first workpiece with respect to the rotary device remain unchanged in step d) of the method such that the first workpiece has the same position and alignment with respect to the rotary device in step e) as it does in step c).

Preferably, in the aforementioned step f) of the method (or as a further circumferential position with respect to the arrangement), the coordinate measuring apparatus is positioned at a third circumferential position with respect to the circumferential direction of the axis of rotation, which differs from the first circumferential position and the second circumferential position, and the workpiece is rotated by the rotary device about the axis of rotation, while the coordinate measuring apparatus positioned at the third circumferential position measures a third extent of the surface of the first workpiece, which extends around the axis of rotation due to the rotation of the first workpiece, such that corresponding third measurement signals of the third extent are generated.

In particular, the first circumferential position, the second circumferential position and the optional further circumferential position(s), at which the coordinate measuring apparatus is positioned with respect to the circumferential direction of the axis of rotation, lie at the same axial position with respect to the axial direction of the axis of rotation. As mentioned above, this enables, in particular, a particularly exact determination of the coordinates of the workpiece over the measured extent of the surface and/or a particularly exact determination of the movement error.

In general, it is preferable to determine coordinates of the surface of the first workpiece extending about the axis of rotation from the redundant surface information that was separated from the error information. The arrangement can have a coordinate determination apparatus with an appropriate design.

Furthermore, it is preferable to use the error information separated from the redundant surface information to check available error information regarding errors of the rotary device. The arrangement can have an error checking apparatus with an appropriate design.

Particularly with reference to the aforementioned measurement of a plurality of workpieces of the same type, the controller can be configured to control a measurement of coordinates of a surface of a second workpiece, taking into account the error information separated from the redundant surface information and using the coordinate measuring apparatus, while the coordinate measuring apparatus is arranged at the first circumferential position, at the second circumferential position, at the optional further circumferential position or at one of the optional further circumferential positions, in particular at the same axial position with respect to the axis of rotation.

In particular with reference to the aforementioned setting of the circumferential position of the coordinate measuring apparatus, the arrangement can have a second rotary device, the axis of rotation of which extends coaxially with respect to the axis of rotation of the rotary device, and wherein the controller is configured to bring the coordinate measuring apparatus from the first circumferential position into the second circumferential position by virtue of it rotating the rotary device at which the first workpiece is arranged by rotating the second rotary device, while the coordinate measuring apparatus remains at the location thereof.

In particular expected error values of the rotary device are established from the error information separated from the redundant surface information, which expected error values are expected in each case for a relative work position and work alignment of the coordinate measuring apparatus or of a machining tool of a machine tool for machining a workpiece on the one hand and of the rotary device on the other hand, wherein at least one work position and/or work alignment of the coordinate measuring apparatus or of the machining tool is established from the expected error values of the rotary device, for which work position and/or work alignment, in the case of a predetermined measurement task for determining coordinates of a workpiece or a predetermined machining task for machining a workpiece, the expected error value of the rotary device
    is smaller than for other work positions and/or work alignments and/or
    satisfies a predetermined condition.

Accordingly, the arrangement can have a prediction apparatus, configured to establish expected error values of the rotary device from the error information separated from the redundant surface information, which expected error values are expected in each case for a relative work position and work alignment of the coordinate measuring apparatus or of a machining tool of a machine tool for machining a workpiece on the one hand and of the rotary device on the other hand, wherein the arrangement has an establishment apparatus, configured to establish at least one work position and/or work alignment of the coordinate measuring apparatus or of the machining tool from the expected error values of the rotary device, for which work position and/or work alignment, in the case of a predetermined measurement task for determining coordinates of a workpiece or a predetermined machining task for machining a workpiece, the expected error value of the rotary device
    is smaller than for other work positions and/or work alignments and/or
    satisfies a predetermined condition.

When establishing the expected error values, it is possible, in particular, to interpolate and/or extrapolate between error values established by separation and/or measurement. Moreover, it is possible to interpolate and/or extrapolate between already established expected error values. Overall, what is obtained e.g. for a range of possible work positions and/or for a range of possible work alignments of the coordinate measuring apparatus or of the machining tool is the expected error of the rotary device in each case. From the expected error, which can be equal to the measured error at the measurement points of the error measurement, it is now possible to establish at least one work position and/or work alignment.

Furthermore, at least one work position and/or one work alignment of the coordinate measuring apparatus or of the machining tool can be established, for which the expected error of the rotary device is small and/or satisfies a predetermined condition. The predetermined condition demands, for example, that the error of the rotary device does not achieve or does not exceed a predetermined error value. In particular, at least one work position and/or work alignment can be established, for which the error of the rotary device is smaller than for other work positions and/or work alignments. However, the predetermined condition can also be related in respect of a measurement task or a machining task, in which an extent of the surface of the workpiece is considered with respect to a waviness of the extent with a specific order (for example of the order of three, i.e. there are three waves of the deviation between an ideal circular and the real, actual extent of the surface). By way of example, the predetermined condition may require the amplitude of the waviness to be measured with an error that is smaller than a threshold or the amplitude of the waviness to be smaller than a threshold when the workpiece is produced.

For the establishment of the at least one work position and/or work alignment, it is possible, as mentioned above, to take into account a predetermined measurement task for determining coordinates of the workpiece or a predetermined machining task for machining the workpiece. By way of example, the object can set the work alignment of the coordinate measuring apparatus or of the machining tool or set a possible or admissible range for the work alignment. The same can apply to the work position. With respect to the work alignment, two work alignments are, in particular, considered to be identical if they extend parallel to one another, i.e. if they can be made to coincide by a parallel mutual displacement. In particular, the work position can be defined as an axial work position, i.e. the work position is specified as a coordinate value of a coordinate axis (e.g. z-axis) which coincides with the ideal axis of rotation. Particularly in this case, the work alignment can always be defined as extending perpendicular to the ideal axis of rotation, for example if forces when probing a workpiece or machining a workpiece are exerted perpendicular to the ideal axis of rotation.

By way of example, a machining tool may be operated in only a specific work alignment at the machine tool. Accordingly, the movability of a tactile or optical probe of a coordinate measuring machine, by means of which a workpiece is intended to be measured, may be restricted, for example for reasons of reducing the measurement error, in such a way that only one work alignment or a small range of different work alignments is/are possible. Depending on the workpiece to be measured or machined, it may, alternatively or additionally, only be possible to arrange the coordinate measuring apparatus or the machining tool in a specific work position or in a specific range of work positions relative to the rotary device. By way of example, if this relates to a very long workpiece, the end of which is intended to be measured and which is to be aligned in the axial direction of the axis of rotation of the rotary device, the end of the workpiece can be arranged, for example, either very close to a holder of the rotary device or very far away from this holder.

Both the work position and the work alignment are therefore related to the rotary device and not to the workpiece. In respect of the errors of the rotary device, what is usually decisive, exclusively or predominantly, is this work position and/or this work alignment in respect of the rotary device. Moreover, there can also be further influences on the error of the rotary device, e.g. the weight of the workpiece, the inertia of the workpiece, the force which the coordinate measuring apparatus or the machining tool exerts on the workpiece, other parameters from measuring/machining the workpiece (e.g. cut depth of the tool) and/or the rotational speed with which the rotary device turns the workpiece. In one embodiment of the present invention, at least one of these additional influencing factors and/or any desired combination of these influencing factors can be included in establishing the error of the rotary device at the respective work alignment and/or work position. By way of example, a measurement of the error of the rotary device can be carried out while the respective influencing factor or the respective combination of influencing factors is acting.

In particular, a measurement of coordinates of a second workpiece or a machining of the second workpiece can be controlled in accordance with the established at least one work position and/or work alignment, wherein the second workpiece and the first workpiece are similar or of the same type. Accordingly, the controller can be configured to control a measurement of coordinates of a second workpiece or a machining of the second workpiece in accordance with the established at least one work position and/or work alignment, wherein the second workpiece and the first workpiece are of the same type.

In particular, the at least one work position and/or work alignment established from the expected error values of the rotary device is output to the controller of the coordinate measuring apparatus or of the machine tool by an establishment apparatus. Here, it is possible that the establishment apparatus is part of the controller. In this case, there is an output to a further part of the controller, which controls the measurement of the workpiece by the coordinate measuring apparatus or the machining of the workpiece by the machine tool. In this way, measuring of the workpiece or machining of the workpiece can be started automatically after establishing the at least one work position and/or work alignment.

By way of example, the coordinate measuring apparatus is a probe for tactile sensing or optical sensing of the workpiece. Alternatively or additionally, this can be a sensor (e.g. a measurement head), which is configured to generate signals in a manner dependent on the measuring of the workpiece, from which signals the coordinates of the workpiece are determinable. The probe can be attached to the measurement head. By way of example, the coordinate measuring apparatus is part of a coordinate measuring machine. The machining tool of the machine tool can be e.g. a cutting tool or a grinding tool.

The scope of the invention also includes a coordinate measuring machine with the arrangement for reducing the error of a rotary device. In particular, the coordinate measuring apparatus can be a component of the CMM and/or the controller can be a component of the coordinate measuring machine such that the controller, for example, also controls the movement of movable parts of the CMM (e.g. along linear axes and/or axes of rotation).

As mentioned previously, the invention can be applied in the field of machine tools. Machine tools often have two rotary devices (which are usually referred to as spindles). One spindle rotates the workpiece during the machining. The other spindle permits a rotation of the machining tool. Here, the axes of rotation of the two spindles are often parallel to one another. As a result of the invention, the tool spindle can be brought into an advantageous rotational position (and hence into a corresponding work alignment) and/or into an advantageous work position along the axis of rotation of the workpiece spindle.

In particular, an error map or an error model can be generated from the established expected error values of the rotary device. The map or the model can, for example, be stored in a data memory, which is accessible by the controller of the coordinate measuring machine or of the machine tool. The difference between an error map and an error model consists of the fact that the error values for the respective work positions and/or work alignments are stored in the error map, while an error model contains at least one calculation prescription in relation to how the expected error values can be calculated from information about the error values at desired work positions and/or work alignments. A combination of error map and error model is possible. By way of example, the error model can set how error values contained in the error map are used to determine expected error values for other work positions and/or work alignments. In particular, it is also possible to take into account the aforementioned further influences on the error of the rotary device, e.g. the weight of the workpiece, by way of different error maps and/or error models respectively assigned to the influencing factor or a combination of influencing factors. A combination of error maps and error models is possible in this case, too.

In particular, an error model can contain information about the rotary device (e.g. the rigidity of the bearing of the rotatably movable part of the rotary device) and it can calculate expected error values of the rotary device for at least one work alignment and/or one work position using this information, which error values are to be expected for specific, in particular predetermined tasks. By way of example, the error model can thus take into account the change in the work conditions due to forces acting when machining the workpiece or when measuring the workpiece.

In particular, the controller of the coordinate measuring machine or of the machine tool can establish advantageous work alignments and/or work positions in respect of the error of the rotary device and propose these to a user. As mentioned above, the controller can, alternatively or additionally, automatically use these advantageous work positions and/or work alignments for the work process.

In the field of machine tools, the invention is particularly suitable for quickly rotating rotary devices, in particular workpiece spindles, since no compensation of the error of the rotary device, e.g. by appropriate updating of the machining tool, is possible at high rotational speeds.

The invention is also suitable in combination with corrections of the error of the rotary device by calculation. By way of example, the rotary device may have been calibrated and corresponding correction values for correcting the error of the rotary device may have been stored, for example for the access by the controller of the coordinate measuring machine or of the machine tool. In this case, the method according to the invention can establish the expected residual errors for various work positions and/or work alignments, taking into account the corrections, and use these, as already described above, as expected errors of the rotary device.

Instead of correcting the errors of the rotary device by calculation and establishing the expected residual errors by calculation, the measurement of the errors of the rotary device can be carried out taking into account the corrections and the residual error can be measured in this way. The expected error values can in turn be established therefrom.

BRIEF DESCRIPTION OF THE DRAWINGS

Exemplary embodiments of the invention will now be described with reference to the attached drawing. In the individual figures of the drawing.

DETAILED DESCRIPTION OF THE PREFERRED EMBODIMENTS

Figure 1:
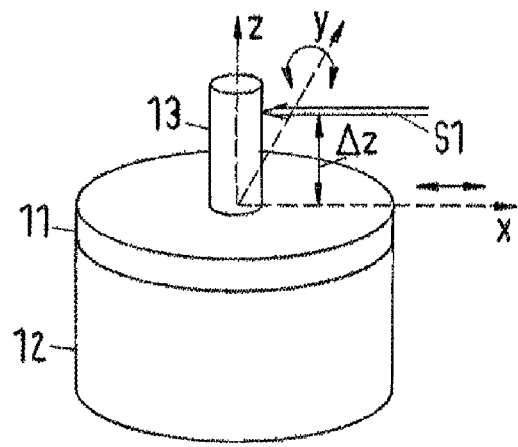
FIG. 1 shows a rotary device, in particular a rotary table, for a coordinate measuring machine, wherein a rotationally symmetric part, in this case a cylinder, is arranged on the rotatable part of the rotary device, the axis of symmetry of which rotationally symmetric part coincides with the axis of rotation of the rotary device, and wherein a specific work position and work alignment, for example of a coordinate measuring apparatus of a coordinate measuring machine, are depicted schematically.

The rotary device depicted in FIG. 1 comprises a rotatable part 11, which is rotatable relative to a non-rotatable part 12 of the rotary device about an ideal axis of rotation, which in the illustration of FIG. 1 coincides with the z-axis (for example the vertical axis) of a Cartesian coordinate system x, y, z. The actual axis of rotation of the rotary device 11, 12, however, deviates from the ideal axis of rotation since the rotary device is affected by error.

FIG. 1 shows a cylindrical workpiece 13, which is arranged on the surface of the rotatable part 11 and the cylinder axis of which is aligned in the direction of the real axis of rotation of the rotary device 11, 12. For the considerations below, the assumption is made that the cylindrical workpiece 13 has no geometrical errors, i.e. it is an ideal cylinder. When a sensor or probe of a coordinate measuring machine, or similarly a machining tool of a machine tool, is aligned at the surface of the cylindrical part 13 in the direction represented by a double-line arrow s1, and when the rotatable part 11 of the rotary device is rotated, and the cylindrical workpiece 13 therefore rotates with it, the error of the rotary device, i.e. the deviation of the real axis of rotation from the ideal axis of rotation, has an effect on the measurement or machining. In particular, the error has a different effect as a function of the work position and work alignment of the probe, sensor or tool. In the case illustrated in FIG. 1, the work position along the z-axis of the coordinate system x, y, z is displaced upward by the amount $\Delta z$ (in the axial direction of the axis of rotation), and extends parallel to the x-axis. As indicated by an arrow pointing in two directions along the x-axis, the error of the rotary device 11, 12 may displace the circumferential surface of the cylindrical part 13 along the x-axis in both directions, i.e. during a complete revolution of the rotatable part 11 the x-position of the surface region of the part 13, at which the probe, sensor or the tool is aligned, varies to and fro in the x-direction.

Figure 2:
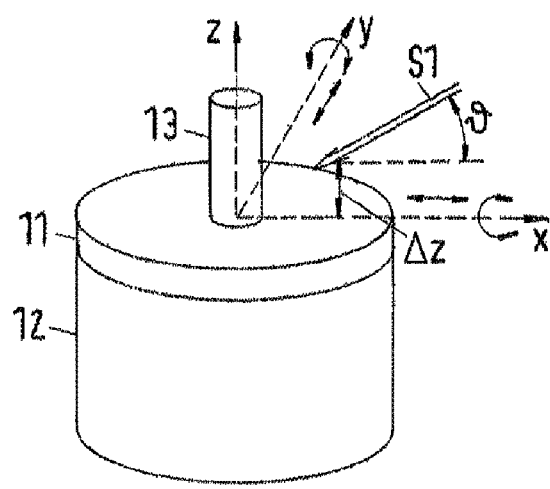
FIG. 2 shows the illustration from FIG. 1, wherein the work alignment and work position of the coordinate measuring apparatus are selected differently to FIG. 1.
Figure 3:
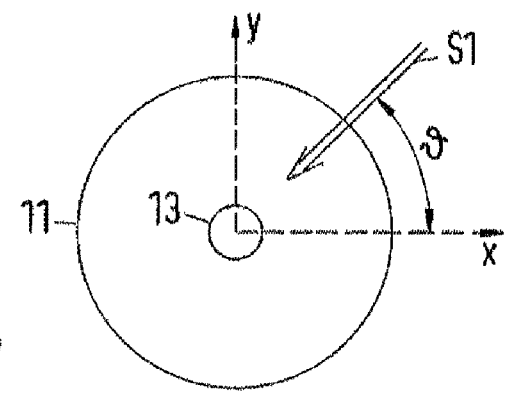
FIG. 3 shows a plan view of the arrangement from FIG. 2 for the purposes of explaining the angle which the work alignment of the sensor includes with a coordinate axis, and hence for the purposes of explaining the circumferential position of the coordinate measuring apparatus, FIG. 4 schematically shows a coordinate measuring machine in a portal design, at the probe head of which a tactile probe is arranged and on the base of which a rotary table is arranged, FIG. 5 schematically shows two rotary devices stacked above one another, which have coaxial axes of rotation, wherein a workpiece measured by a coordinate measuring apparatus probing in a tactile manner is positioned on the upper rotary device, while the workpiece is rotated by the upper rotary device, and FIG. 6 schematically shows a block diagram of an arrangement with a rotary device, a measuring arrangement, a prediction apparatus, an establishment apparatus and a controller of a coordinate measuring machine or of a machine tool.

FIG. 2 shows the arrangement of FIG. 1, but with the work alignment changed. In the case illustrated, as in FIG. 1, the work position lies above the xy-plane (this plane is, for example, also the plane of the rotary table surface) of the coordinate system by the amount $\Delta z$. The work alignment also extends perpendicularly to the z-axis, but makes an angle $\vartheta$ with a parallel to the x-axis. A corresponding plan view is illustrated in FIG. 3. Therefore, the circumferential position is modified. It can be specified by the angle $\vartheta$.

Both in FIG. 1 and in FIG. 2, it is indicated by curved-line arrows about the x-axis and y-axis, respectively, that the real axis of rotation of the rotary device may tilt (i.e. turn or rotate) about the x-axis and the y-axis while the rotatable part 11 is being rotated.

Figure 4:
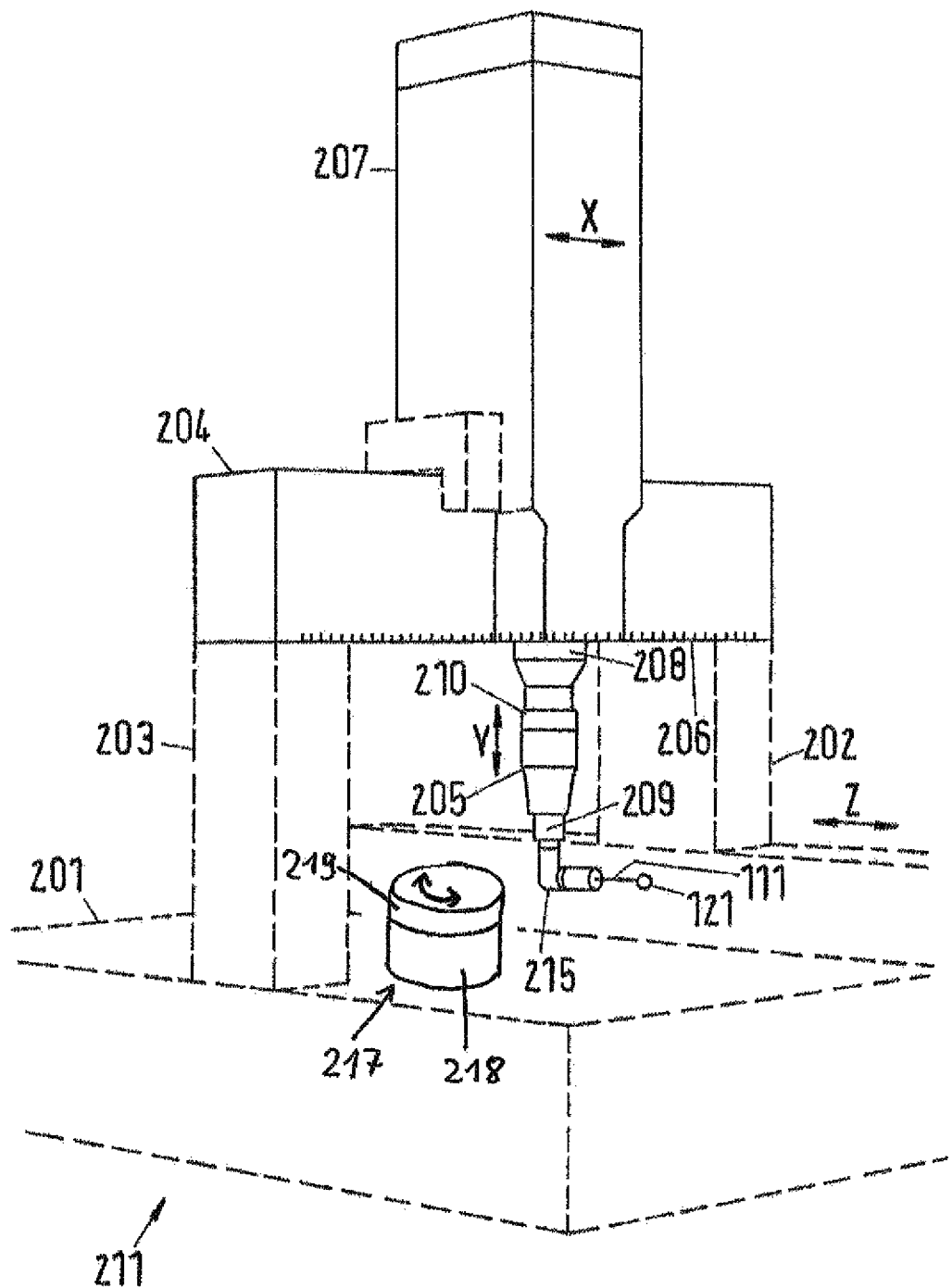

The coordinate measuring machine (CMM) 211 with a portal design, depicted in FIG. 4, comprises a base 201, above which columns 202, 203 are arranged in a manner movable in the Z-direction of a Cartesian coordinate system. Together with a crossbeam 204, the columns 202, 203 form a portal of the CMM 211. At its opposite ends, the crossbeam 204 is connected to the columns 202 and 203, respectively. Electric motors not depicted in any more detail cause the linear movement of the columns 202, 203 in the Z-direction. Here, for example, one electric motor is associated with each one of the two columns 202, 203.

The crossbeam 204 is combined with a cross slide 207, which is movable, by way of air bearings, along the crossbeam 204 in the X-direction of the Cartesian coordinate system. The current position of the cross slide 207 relative to the crossbeam 204 can be determined on the basis of a scale graduation 206. The movement of the crossbeam 204 in the X-direction is driven by a further electric motor. A mandrel 208, which is movable in the vertical direction, is mounted on the cross slide 207 and connected at the lower end thereof to a coordinate measuring apparatus 209 by way of a mounting apparatus 210 and a rotary device 205. The coordinate measuring apparatus 209 comprises an angled probe head 215, on which a stylus 111 with a ball tip 121 is arranged in a removable manner. The coordinate measuring apparatus 209 can be moved relative to the cross slide 207 in the Y-direction of the Cartesian coordinate system, by way of being driven by a further electric motor. The probe head 209 can be brought into virtually any positions in the region below the crossbeam 204 by way of the electric motors of the CMM. Furthermore, the rotary device 205 can rotate the probe head 215 about the Y-axis such that the stylus 111 can be aligned in different directions.

A rotary table 217 (i.e. a rotary device) with an integrated rotational position sensor (not depicted in FIG. 4) is arranged on the base 201. The arrangement should be understood to be schematic. In practice, the rotary table 217 will be arranged at a position in which the stylus 111, or a different stylus, can probe a workpiece (not depicted) arranged on the rotary table 217 in the radial direction of the axis of rotation of the rotary table 217 from all sides with as little impediment as possible, i.e. in as many work alignments as possible and hence at different circumferential positions. A corresponding statement also applies, as far as possible, over the whole height range along the extent of the axis of rotation of the rotary device 217 (i.e. in the axial direction of the axis of rotation) for all work positions of the stylus.

The coordinate measuring machine illustrated in FIG. 4 is only an exemplary embodiment. The coordinate measuring apparatus or a different coordinate measuring apparatus can be, for example, a component of a different type of coordinate measuring machine, e.g. an articulated arm-type CMM.

In accordance with one embodiment of the method, a workpiece, such as e.g. the cylinder from FIG. 1 to FIG. 3, is arranged on the rotary device 217 and the stylus 111 is used to measure the extent of the surface of the workpiece while the rotary device 217 rotates the workpiece. In particular, there is a scanning-type measurement.

Figure 5:
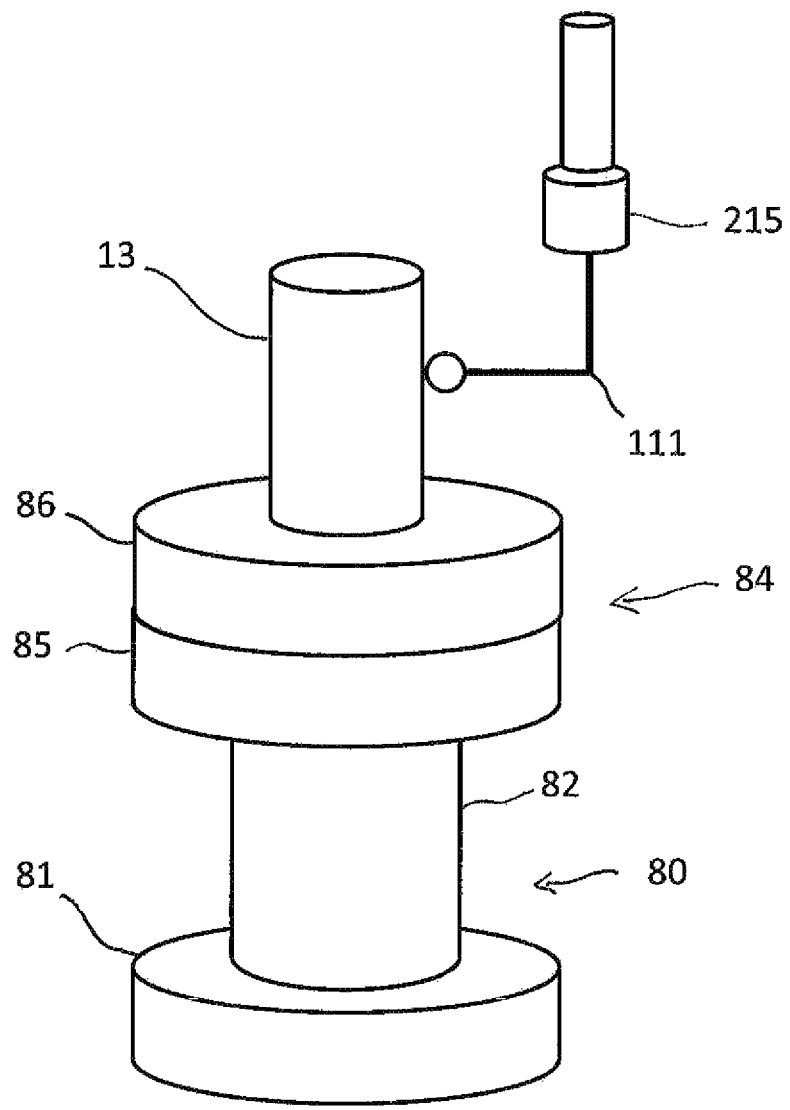

FIG. 5 shows a first, upper rotary device 84, which has a first, lower part 85 and a second part 86, rotatable relative to the first part 85 about a first axis of rotation. A workpiece 13 is arranged on the second part 86.

Arranged below the first rotary device 84 is a second, lower rotary device 80, which has a first part 81 and a second part 82, rotatable relative to the first part 81, which are rotatable relative to one another about a second axis of rotation. The first axis of rotation of the first rotary device 84 and the second axis of rotation of the second rotary device 80 are coaxial with one another.

Furthermore, the workpiece 13 in the exemplary embodiment is a rotationally symmetric workpiece, the axis of symmetry of which is aligned coaxially with the axes of rotation. However, it is also possible to arrange another, non-rotationally symmetric part on the first rotary device such that the former is rotatable by the first rotary device 84. Furthermore, a rotationally symmetric workpiece need not be arranged coaxially with the axis of rotation of the first rotary device 84.

A coordinate measuring apparatus with a stylus 111, which, for example, is the stylus 111 of the arrangement from FIG. 4, probes the external circumference of the workpiece 13 while the first rotary device 84 rotates the workpiece 13 about the first axis of rotation. In so doing, the coordinate measuring apparatus remains stationary. However, the stylus 111 is deflected in a manner dependent on the extent of the surface, as is conventional in the case of styli probing in a tactile manner in the field of coordinate metrology, in order to generate the measurement signal from which the coordinate measuring apparatus establishes the point of contact between the stylus 111 and the surface of the workpiece. In particular, the stylus 111 is deflected relative to a probe head 215 (which is, for example, the probe head from FIG. 4 or a different probe head). In so doing, the deflection during the rotation of the workpiece 13 can change, in particular when movement errors of the rotary device 84 lead to a displacement of the workpiece 13 along a linear axis extending across the axis of rotation or lead about an axis of rotation extending across the axis of rotation of the rotary device 84 by rotation of the workpiece 13. The deflection of the stylus 111 also changes when the extent of the surface of the workpiece 13 probed by the stylus 111 is not rotationally symmetric with respect to the ideal axis of rotation. However, deviations from the rotational symmetry and movement errors of the rotary device 84 can also compensate one another. For this reason, the probing of the surface of the workpiece 13 during a rotation of the workpiece 13 is repeated by the coordinate measuring apparatus 84, but at a different circumferential position of the coordinate measuring apparatus with respect to the first axis of rotation of the first rotary device 84. To this end, use is made of the second rotary device 80. The second part 82 is rotated relative to the first part 81 such that the first rotary device 84 with the workpiece 13 arranged thereon is rotated. As a result, the coordinate measuring apparatus assumes a different circumferential position without having been moved.

The advantage of using a second rotary device for setting the circumferential position consists of the fact that the coordinate measuring apparatus does not need to be moved and, in particular, no additional errors, which are caused by a different position or alignment of the coordinate measuring apparatus, can be created as a consequence.

Figure 6:
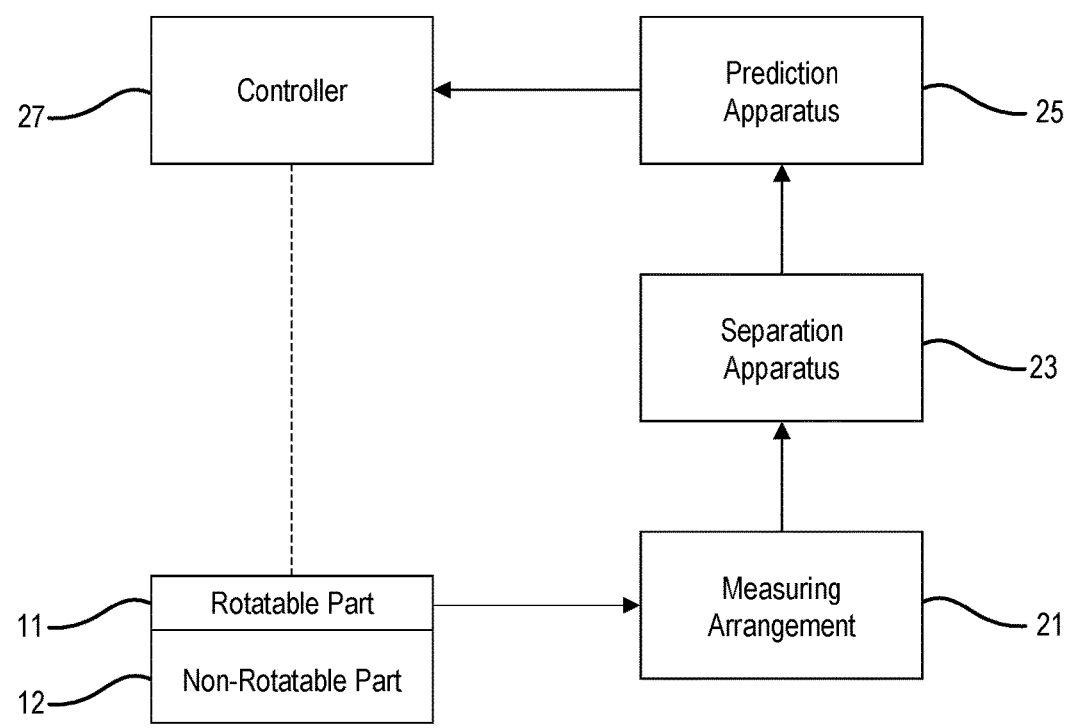

FIG. 6 schematically shows an arrangement comprising a rotary device, for example the rotary device in accordance with FIG. 1 to FIG. 4 or the upper rotary device 84 in accordance with FIG. 5. A rotatable part 11 of the rotary device can be rotated relative to a non-rotatable part 12. The measuring arrangement 21 is configured to measure the extent of the surface of a workpiece which is arranged on the rotatable part 11 and to supply corresponding measurement signals to a separation apparatus 23. This separation apparatus 23 is configured to separate from one another the redundant surface information and the error information, which, overall, are contained in the measurement signals, from the totality of the first, the second and the optional further measurement signals (which are generated when measuring the respective first, second or optional further extent measured by the measuring arrangement). In particular, the separation apparatus 23 determines the surface information by means of a coordinate determination apparatus (for example the coordinates of the surface by way of the measured extent) and the error information by means of an error determination apparatus and hence the movement errors of the rotary device 11, 12.

Optionally, a prediction apparatus 25 is connected to the separation apparatus 23 and configured to establish from the error information expected error values of the rotary device 11, 12, which error values are expected in each case for a relative work position and work alignment of the coordinate measuring apparatus or of a machining tool of a machine tool for machining a workpiece on the one hand and the rotary device 11, 12 on the other hand. Furthermore, the prediction apparatus 25 can have an establishment apparatus, configured to establish at least one work position and/or work alignment of the coordinate measuring apparatus or of the machining tool from the expected error values of the rotary device 11, 12, for which the expected error value of the rotary device 11, 12 in the case of a predetermined measurement task for determining coordinates of a workpiece or a predetermined machining task for machining a workpiece is smaller than for other work positions and/or work alignments and/or satisfies a predetermined condition.

A controller 27 connected to the prediction apparatus 25 is configured to set the established work position and/or work alignment. This is depicted schematically by a dashed line. The coordinate measuring apparatus or the machining tool, the work position and/or work alignment of which is to be set, is not explicitly shown in FIG. 6.

An example for the separation of the surface information of the workpiece and the error information (i.e. the movement error of the rotary device) from one another is now described below. In so doing, a theoretically possible ideal form is assumed. In the case of a rotationally symmetric workpiece arranged coaxially with respect to the ideal axis of rotation, this is, for example, a circular line, the center of which is pierced by the ideal axis of rotation. Deviations from the ideal form are referred to below as the error R of the workpiece. Taking into account the known ideal form, it is possible to determine the extent of the surface, which is measured by the coordinate measuring apparatus during the rotation of the workpiece about the axis of rotation of the rotary device, from the error R of the workpiece. The error R of the workpiece depends on the rotational angle $\Theta$, which denotes the current rotational position of the workpiece.

The measurement signals measured by the coordinate measuring apparatus at the first circumferential position with respect to the axis of rotation can therefore be considered to be signals of the error sum of the movement error and the error of the workpiece. For the first circumferential position, this error sum is denoted as mA below. It can be considered to be a mathematical function mA($\Theta$) of the rotational angle $\Theta$, since the workpiece is rotated about the axis of rotation by the rotary device.

It is now possible to introduce a coordinate system with two coordinate axes, which extend perpendicular to one another and extend perpendicular to the ideal axis of rotation in each case. Here, the origin of this two-dimensional coordinate system lies on the ideal axis of rotation at the axial position at which the coordinate measuring apparatus is situated when it measures the extent of the surface of the workpiece in the first, a second and a third circumferential position, which differ from one another, respectively when the workpiece is rotated by the rotary device. Here, the rotational position of the two-dimensional coordinate system can be selected in such a way that the first circumferential position lies on the x-axis, i.e. the first axis of the coordinate system. The other axis of the coordinate system is referred to as y-axis.

The measurement signals measured at the second and third circumferential positions by the coordinate measuring apparatus can also be considered to be mathematical functions $m_B(\Theta)$ and $m_C(\Theta)$, respectively, of the rotational angle $\Theta$. Therefore, the following applies to the three measurement signals considered to be error functions $m_A$, $m_B$, $m_C$:

$$m_A = R(\theta) + x(\theta) \tag{1}$$

$$m_B = R(\theta - \phi) + x(\theta)\cos(\phi) + y(\theta)\sin(\phi) \tag{2}$$

$$m_C = R(\theta - \psi) + x(\theta)\cos(\psi) + y(\theta)\sin(\psi) \tag{3}$$

Here, $\Phi$ and $\psi$ are the angles which, using the trigonometric functions used in the equations, denote the second circumferential position and the third circumferential position, respectively. Furthermore, x($\Theta$) and y($\Theta$), respectively, denote the error of the rotary device in the x-direction and y-direction. As mentioned above and like the error of the workpiece, these errors are mathematical functions of the rotational angle $\Theta$.

The following emerges by summing the measurement signals for the three measurement signals measured at the different circumferential positions:

$$M(\theta) = m_A(\theta) + a \times m_B(\theta) + b \times m_C(\theta) \tag{4}$$

Taking into account the appropriately selected unity coefficients a and b, the movement error of the rotary device can be eliminated as outlined below. To this end, equations (1), (2) and (3) are inserted into equation (4):

$$M(\theta) = R(\theta) + x(\theta) + a \times (R(\theta - \phi) + x(\theta)\cos(\phi) + y(\theta)\sin((\phi))) + b \times (R(\theta - \psi) + x(\theta)\cos(\psi) + y(\theta)\sin((\psi))) \tag{5}$$

This can be rewritten as:

$$M(\theta) = R(\theta) + a \times R(\theta - \phi) + b \times R(\theta - \psi) + x(\theta) \times (1 + a \times \cos(\phi) + b \times \cos(\psi)) + y(\theta) \times (a \times \sin(\phi) + b \times \sin(\psi)) \tag{6}$$

If the movement of the rotary device, i.e. the terms x($\theta$) and y($\theta$), should no longer appear in the sum M($\Theta$) of the measurement signals (see equation 4), the factors a and b are to be selected in such a way that the following applies:

$$1 + a \times \cos(\phi) + b \times \cos(\psi) = 0 \tag{7}$$

and $$a \times \sin(\phi) + b \times \sin(\psi) = 0 \tag{8}$$

The following emerges for the factors a and b from equations (7) and (8):

$$a = \frac{-\sin(\psi)}{\sin(\psi - \phi)} \tag{9}$$

and $$b = \frac{\sin(\phi)}{\sin(\psi - \phi)} \tag{10}$$

The sought-after error R($\theta$) of the workpiece can be described as follows in the form of a Fourier series:

$$R(\theta) = \sum_{k=1}^{\infty} (A_k \cos(k\theta) + B_k \sin(k\theta)) \tag{11}$$

Likewise, the sum M($\theta$) of the measurement signals (see equation 4) can be decomposed into a Fourier series. As described above, the factors a and b were selected correctly (equations 9 and 10):

$$M(\theta) = \sum_{k=1}^{\infty} (F_k \cos(k\theta) + G_k \sin(k\theta)) \tag{12}$$

Therefore, the coefficients $F_k$ and $G_k$ of the decomposition can be calculated. If equation (11) is inserted into equation (6), the sum M($\theta$) of the measurement signals can also be written as follows:

$$M(\theta) = \sum_{k=1}^{\infty} (A_k \cos(k\theta) + B_k \sin(k\theta)) + \\ a \times \sum_{k=1}^{\infty} (A_k \cos(k(\theta - \phi)) + B_k \sin(k(\theta - \phi))) + \\ b \times \sum_{k=1}^{\infty} (A_k \cos(k(\theta - \psi)) + B_k \sin(k(\theta - \psi))) \tag{13}$$

According to the addition theorems for sine and cosine, the following is obtained:

$$M(\theta) = \sum_{k=1}^{\infty}(A_k\cos(k\theta)+B_k\sin(k\theta))+ \quad (14)$$

$$a \times \sum_{k=1}^{\infty}\begin{pmatrix} A_k\cos(k\theta)\cos(k\phi)+A_k\sin(k\theta)\sin(k\phi)+ \\ B_k\sin(k\theta)\cos(k\phi)-B_k\cos(k\theta)\sin(k\phi) \end{pmatrix}+$$

$$b \times \sum_{k=1}^{\infty}\begin{pmatrix} A_k\cos(k\theta)\cos(k\psi)+A_k\sin(k\theta)\sin(k\psi)+ \\ B_k\sin(k\theta)\cos(k\psi)-B_k\cos(k\theta)\sin(k\psi) \end{pmatrix}$$

Sorted according to $\sin(k\theta)$ and $\cos(k\theta)$, the following emerges:

$$M(\theta) = \sum_{k=1}^{\infty}\begin{pmatrix} \sin(k\theta)\times \\ (A_k(a\sin k\phi)+b\sin(k\psi))+ \\ B_k(1+a\cos(k\phi)+b\cos(k\psi))+ \\ \cos(k\theta)\times \\ (A_k(1+a\cos k\phi)+b\cos(k\psi))- \\ B_k(a\sin(k\phi)+b\sin(k\psi))) \end{pmatrix} \quad (15)$$

By substituting $$\alpha_k=1+a\cos(k\phi)+b\cos(k\psi)$$

and $$\beta_k=1+b\sin(k\psi)+b\sin(k\phi) \quad (30)$$

the sum of the input signals can be represented as $$M(\theta)=\sum_{k=1}^{\infty}((A_k\alpha_k-B_k\beta_k)\cos(k\theta)+(A_k\beta_k+B_k\alpha_k)\sin(k\theta)) \quad (16)$$

If equation (12) is now compared with equation (16), it is possible to identify that the following must hold true:

$$F_k=A_k\alpha_k-B_k\beta_k \text{ and}$$

$$G_k=A_k\beta_k-B_k\alpha_k \quad (17)$$

Since the substitutions $\alpha_k$ and $\beta_k$ are known, the system of equations of equation (17) can be solved for each k and therefore the aforementioned coefficients $A_k$ and $B_k$ of the Fourier series in accordance with equation (11) can be calculated. If these coefficients are known, the Fourier series in equation (11) is also completely determined and the error $R(\theta)$ of the workpiece can be calculated by an inverse transform of this equation. Once the error has been calculated, the movement of the rotary device in the x-direction, i.e. $x(\theta)$, can be calculated by equation (1). Once this is known, equations (2) and (3) can likewise be solved and the error separation is complete.

The invention claimed is:

1. A method for reducing errors of a rotary device when determining coordinates of a workpiece, wherein the rotary device enables a rotational movement of the workpiece about an axis of rotation of the rotary device when determining the coordinates, and wherein the method comprises the following steps:
   a) arranging a first workpiece at the rotary device,
   b) positioning a coordinate measuring apparatus for measuring coordinates of a surface of the first workpiece at a first circumferential position with respect to the circumferential direction of the axis of rotation,
   c) rotating the first workpiece about the axis of rotation by the rotary device while the coordinate measuring apparatus positioned at the first circumferential position measures a first extent of the surface of the first workpiece which extends around the axis of rotation due to the rotation of the first workpiece such that corresponding first measurement signals of the first extent are generated,
   d) positioning the coordinate measuring apparatus at a second circumferential position with respect to the circumferential direction of the axis of rotation which differs from the first circumferential position,
   e) rotating the first workpiece about the axis of rotation by the rotary device while the coordinate measuring apparatus positioned at the second circumferential position measures a second extent of the surface of the first workpiece which extends around the axis of rotation due to the rotation of the first workpiece such that corresponding second measurement signals of the second extent are generated,
   f) optionally repeating steps d) and e) at least one further time, i.e. the coordinate measuring apparatus is respectively positioned at a further circumferential position with respect to the circumferential direction of the axis of rotation which differs from the first circumferential position and the second circumferential position and from other circumferential positions, at which the coordinate measuring apparatus was already positioned and at which the coordinate measuring apparatus has already measured an associated extent of the surface of the first workpiece, and the workpiece is rotated about the axis of rotation by the rotary device while the coordinate measuring apparatus positioned at the further circumferential position measures a further extent of the surface of the first workpiece which extends around the axis of rotation due to the rotation of the first workpiece such that corresponding further measurement signals of the further extent are generated,
   g) separating the redundant surface information and the error information from one another from the first, from the second and from the optional further measurement signals, which have redundant surface information about the surface of the first workpiece extending around the axis of rotation and error information about errors of the rotary device due to deviations between, firstly, actual positions and actual alignments of the axis of rotation and, secondly, corresponding ideal positions and ideal alignments of the axis of rotation, and
   h) measuring the coordinates of a surface of a second workpiece by the coordinate measuring apparatus taking into account the error information separated from the redundant surface information, while the coordinate measuring apparatus is situated at the same axial position with respect to the axial direction of the axis of rotation as in steps c) and e).

2. The method as claimed in claim 1, wherein the position and alignment of the first workpiece with respect to the rotary device remain unchanged in step d) such that the first workpiece has the same position and alignment with respect to the rotary device in step e) as it does in step c).

3. The method as claimed in claim 1, wherein the first circumferential position, the second circumferential position and the optional further circumferential position(s), at which the coordinate measuring apparatus is positioned with respect to the circumferential direction of the axis of rotation, lie at the same axial position with respect to the axial direction of the axis of rotation.

4. The method as claimed in claim 1, wherein coordinates of the surface of the first workpiece extending about the axis of rotation are determined from the redundant surface information that was separated from the error information.

5. The method as claimed in claim 1, wherein expected error values of the rotary device are established from the error information separated from the redundant surface information, which expected error values are expected in each case for a relative work position and work alignment of the coordinate measuring apparatus or of a machining tool of a machine tool for machining a workpiece on the one hand and of the rotary device on the other hand, and wherein at least one work position and/or work alignment of the coordinate measuring apparatus or of the machining tool is established from the expected error values of the rotary device, for which work position and/or work alignment, in the case of a predetermined measurement task for determining coordinates of a workpiece or a predetermined machining task for machining a workpiece, the expected error value of the rotary device—
is smaller than for other work positions and/or work alignments and/or
satisfies a predetermined condition.

6. The method as claimed in claim 5, wherein a measurement of coordinates of a second workpiece or a machining of the second workpiece is controlled in accordance with the established at least one work position and/or work alignment, wherein the second workpiece and the first workpiece are of the same type.

7. The method as claimed in claim 1, wherein coordinates of a surface of a second workpiece are measured by the coordinate measuring apparatus, taking into account the error information separated from the redundant surface information, while the coordinate measuring apparatus is arranged at the first circumferential position, at the second circumferential position, at the optional further circumferential position or at one of the optional further circumferential positions.

8. The method as claimed in claim 1, wherein the coordinate measuring apparatus is brought into the second circumferential position from the first circumferential position by virtue of the rotary device being rotated by a second rotary device, the axis of rotation of which extends coaxially with the axis of rotation of the rotary device, while the coordinate measuring apparatus remains at the location thereof.

9. An arrangement for reducing errors of a rotary device when determining coordinates of a workpiece, comprising:
    a rotary device, having a first part and a second part with rotational mobility relative to the first part about an axis of rotation of the rotary device, wherein a first workpiece is arrangeable at the first part such that it is rotatable about the axis of rotation by way of the rotary device,
    a coordinate measuring apparatus for measuring coordinates of a surface of the first workpiece,
    a controller, configured to—
        measure a first extent of the surface of the first workpiece by controlling the coordinate measuring apparatus, which is positioned at a first circumferential position with respect to the circumferential direction of the axis of rotation, and generate corresponding first measurement signals, wherein the first extent of the surface extends about the axis of rotation due to a rotation of the first workpiece by way of the rotary device,
        measure a second extent of the surface of the first workpiece by controlling the coordinate measuring apparatus, which is positioned at a second circumferential position with respect to the circumferential direction of the axis of rotation, and generate corresponding second measurement signals, wherein the second circumferential position differs from the first circumferential position and the second extent of the surface extends about the axis of rotation due to a rotation of the first workpiece by way of the rotary device, and
        optionally measure a further extent of the surface of the first workpiece by controlling the coordinate measuring apparatus, which is positioned at a further circumferential position with respect to the circumferential direction of the axis of rotation during at least one further optional measurement, and generate corresponding further measurement signals, wherein the further circumferential position differs from the first circumferential position and from the second circumferential position and from optional other further circumferential positions, and the further extent of the surface extends about the axis of rotation due to a rotation of the first workpiece by way of the rotary device, and
    a separation apparatus, configured to separate the redundant surface information and the error information from one another from the first, from the second and from the optional further measurement signals, which have redundant surface information about the surface of the first workpiece extending around the axis of rotation and error information about errors of the rotary device due to deviations between, firstly, actual positions and actual alignments of the axis of rotation and, secondly, corresponding ideal positions and ideal alignments of the axis of rotation,
    wherein the controller is furthermore configured to measure coordinates of a surface of a second workpiece by the coordinate measuring apparatus by controlling the coordinate measuring apparatus, taking into account the error information separated from the redundant surface information, while the coordinate measuring apparatus is situated at the same axial position with respect to the axial direction of the axis of rotation as when measuring the first and second extents of the surface of the first workpiece.

10. The arrangement as claimed in claim 9, wherein the first circumferential position, the second circumferential position and the optional further circumferential position(s), at which the coordinate measuring apparatus is positioned with respect to the circumferential direction of the axis of rotation, lie at the same axial position with respect to the axial direction of the axis of rotation.

11. The arrangement as claimed in claim 9, wherein the arrangement has an error checking apparatus, configured to check available error information about errors of the rotary device using the error information separated from the redundant surface information.

12. The arrangement as claimed in claim 9, wherein the arrangement has a prediction apparatus, configured to establish expected error values of the rotary device from the error information separated from the redundant surface information, which error values are expected in each case for a relative work position and work alignment of the coordinate measuring apparatus or of a machining tool of a machine tool for machining a workpiece on the one hand and the rotary device on the other hand, and
    wherein the arrangement has an establishment apparatus, configured to establish at least one work position and/or work alignment of the coordinate measuring apparatus or of the machining tool from the expected error values of the rotary device, for which the expected error value of the rotary device in the case of a predetermined measurement task for determining coordinates of a workpiece or a predetermined machining task for machining a workpiece— is smaller than for other work positions and/or work alignments and/or satisfies a predetermined condition.

13. The arrangement as claimed in claim 9, wherein the controller is configured to control a measurement of coordinates of a surface of a second workpiece, taking into account the error information separated from the redundant surface information and using the coordinate measuring apparatus, while the coordinate measuring apparatus is arranged at the first circumferential position, at the second circumferential position, at the optional further circumferential position or at one of the optional further circumferential positions.

14. The arrangement as claimed in claim 9, wherein the arrangement has a second rotary device, the axis of rotation of which extends coaxially with respect to the axis of rotation of the rotary device, and wherein the controller is configured to bring the coordinate measuring apparatus from the first circumferential position into the second circumferential position by virtue of it rotating the rotary device at which the first workpiece is arranged by rotating the second rotary device, while the coordinate measuring apparatus remains at the location thereof.

15. A coordinate measuring machine with an arrangement as claimed in claim 9.

* * * * *